US012775270B2

(12) United States Patent
Hernandez Soto

(10) Patent No.: US 12,775,270 B2
(45) Date of Patent: Oct. 27, 2026

(54) AUTONOMOUS MANUFACTURING SYSTEM COMPRISING A MANUFACTURING DEVICE AND MULTIPLE AUTONOMOUS SUPPLY DEVICES

(71) Applicant: AIRBUS OPERATIONS, S.L.U., Madrid (ES)

(72) Inventor: Roberto Hernandez Soto, Madrid (ES)

(73) Assignee: Airbus Operations, S.L.U., Madrid (ES)

(*) Notice: Subject to any disclaimer, the term of this patent is extended or adjusted under 35 U.S.C. 154(b) by 497 days.

(21) Appl. No.: 18/514,555

(22) Filed: Nov. 20, 2023

(65) Prior Publication Data

US 2024/0310820 A1 Sep. 19, 2024

(30) Foreign Application Priority Data

Mar. 13, 2023 (EP) .................................... 23382231

(51) Int. Cl.

| | |
|---|---|
| ***G05B 19/41*** | (2006.01) |
| ***B60L 53/57*** | (2019.01) |
| ***B60L 53/66*** | (2019.01) |
| ***G05B 19/418*** | (2006.01) |

(52) U.S. Cl.

CPC ........ *G05B 19/41895* (2013.01); *B60L 53/57* (2019.02); *B60L 53/66* (2019.02)

(58) Field of Classification Search

None

See application file for complete search history.

(56) References Cited

U.S. PATENT DOCUMENTS

| | | | | |
|---|---|---|---|---|
| 8,583,303 B2 * | 11/2013 | Bastien | .................... | B60L 53/32 701/22 |
| 9,650,138 B2 | 5/2017 | Yates | | |
| 9,722,442 B2 * | 8/2017 | Berry | ........................ | B60K 1/04 |
| 9,864,371 B2 * | 1/2018 | Douglas | ............... | G05D 1/0022 |
| 9,969,283 B2 * | 5/2018 | Deahl | ...................... | B60L 53/80 |

(Continued)

FOREIGN PATENT DOCUMENTS

| | | | | |
|---|---|---|---|---|
| CN | 109412245 A * | 3/2019 | ............ | H02J 7/0027 |
| EP | 3098927 A1 * | 11/2016 | ............ | H02J 13/333 |

(Continued)

OTHER PUBLICATIONS

He et al., "Mobile-to-Mobile Energy Replenishment in Mission-Critical Robotic Sensor Networks", IEEE INFOCOM 2014—IEEE Conference on Computer Communications. (Year: 2014).*

Artal-Sevil et al., "Forklifts, Automated Guided Vehicles and Horizontal Order Pickers in Industrial Environments. Energy Management of an Active Hybrid Power System based on Batteries, PEM Fuel Cells and Ultracapacitors", Intl Conf on Renewable Energies and Power Quality (ICREPQ'17), Apr. 2017. (Year: 2017).*

(Continued)

*Primary Examiner* — Mohammad Ali
*Assistant Examiner* — Kelvin Booker
(74) *Attorney, Agent, or Firm* — Nixon & Vanderhye P.C.

(57) ABSTRACT

A mobile autonomous manufacturing system including an autonomously mobile main device (10) performing a manufacturing task, a first auxiliary device (11) adapted to autonomously supply energy to the main device (10), a second auxiliary device (12), adapted to autonomously supply manufacturing items to the main device (10). A method for operating such a mobile autonomous manufacturing system, in which the auxiliary devices (11,12) move autonomously to and from the main device (10) and synchronously with the main device (10) when supplying the main device (10).

17 Claims, 9 Drawing Sheets

(56) References Cited

U.S. PATENT DOCUMENTS

| | | | | |
|---|---|---|---|---|
| 10,272,567 | B2 * | 4/2019 | Shelton | B25J 9/162 |
| 10,442,312 | B2 | 10/2019 | Liang et al. | |
| 10,562,398 | B2 | 2/2020 | High et al. | |
| 10,583,814 | B2 | 3/2020 | Hoareau et al. | |
| 10,802,490 | B2 | 10/2020 | Harris et al. | |
| 10,987,803 | B2 * | 4/2021 | Shelton | B25J 9/162 |
| 11,415,981 | B1 * | 8/2022 | Kim | B60P 1/02 |
| 12,339,663 | B2 * | 6/2025 | Deng | G05D 1/0022 |
| 2006/0273756 | A1 * | 12/2006 | Bowling | B60L 1/003 320/107 |
| 2013/0110281 | A1 * | 5/2013 | Jones | G05D 1/00 700/228 |
| 2016/0266578 | A1 * | 9/2016 | Douglas | G05D 1/0022 |
| 2016/0346922 | A1 * | 12/2016 | Shelton | B25J 9/162 |
| 2017/0163073 | A1 | 6/2017 | Neander et al. | |
| 2018/0024554 | A1 | 1/2018 | Brady et al. | |
| 2019/0047701 | A1 | 2/2019 | Winkle et al. | |
| 2019/0255702 | A1 * | 8/2019 | Shelton | B25J 9/162 |
| 2019/0366867 | A1 | 12/2019 | Gariepy et al. | |
| 2022/0155788 | A1 | 5/2022 | Hattori | |

FOREIGN PATENT DOCUMENTS

| | | | | |
|---|---|---|---|---|
| JP | 2017117256 A | | 6/2017 | |
| KR | 1020190114753 A | | 10/2019 | |
| WO | WO-2018137047 A1 | * | 8/2018 | B60P 1/02 |

OTHER PUBLICATIONS

Arvin et al., "Perpetual Robot Swarm: Long-Term Autonomy of Mobile Robots Using on-the-fly Inductive Charging", J Intell Robot Syst (2018) 92:395-412. (Year: 2018).*

Santos et al., "Field Robots for Intelligent Farms—Inhering Features from Industry", Sep. 2020, Agronomy 2020, 10, 1638. (Year: 2020).*

El Houssein Chouaib Harik, "Design and Implementation of an Autonomous Charging Station for Agricultural Electrical Vehicles", Appl. Sci. Jul. 2021 (17 pages).

Guo Li et al, "A Master-Slave Separate Parallel Intelligent Mobile Robot Used for Autonomous Pallet Transportation", Appl. Sci. 9, 368, Jan. 2019 (18 pages).

Extended European Search Report for EP 23382231.1, dated Jul. 28, 2023, 8 pages.

* cited by examiner

AUTONOMOUS MANUFACTURING SYSTEM COMPRISING A MANUFACTURING DEVICE AND MULTIPLE AUTONOMOUS SUPPLY DEVICES

RELATED APPLICATION

This application incorporates by reference and claims priority to European patent application 23382231-1, filed Mar. 13, 2023.

TECHNICAL FIELD

The invention relates to autonomous manufacturing systems and devices. More particularly, the invention relates to mobile autonomously supplied manufacturing systems and related methods to operate such autonomous system. The invention relates to a system in which a mobile autonomous manufacturing device is autonomously supplied by multiple autonomous supply devices.

BACKGROUND

Many industries use automated manufacturing. Although fixed machines are already extensively used to manufacture products, recent technological developments have allowed introducing mobile autonomous devices in the manufacturing area. The possibilities made available in manufacturing by such autonomous devices are wide. Indeed such autonomous devices may increase productivity, while ensuring difficult tasks or tasks in hazardous areas.

Mobile autonomous devices require navigation capacities as well as energetic autonomy since they are not at fixed locations.

Various options have already been developed depending on the functionalities of the autonomously mobile manufacturing device. In some instances, the mobile manufacturing device may be connected to an energy source through an umbilical cord in the form of a flexible electrical cable for example. However, for some types of operations, an autonomous manufacturing device may not have an umbilical cord as this would impede most of its autonomous displacements.

In other instances, the mobile manufacturing device may comprise onboard electro-chemical batteries. Electro-chemical batteries have the benefit of being generally stable and non-dangerous and to only require an electrical source to be loaded. In these instances, the mobile manufacturing device, similarly to devices designed for particular homes, autonomously rejoins a docking station at regular intervals in order to load its electro-chemical batteries.

However, autonomous devices with onboard electro-chemical batteries have the inconvenience that such batteries are slow to load. Therefore the autonomous device is either not available while its batteries are loading, or requires the handling of batteries to be replaced by an operator, which operation also interrupts the manufacturing tasks of the autonomous manufacturing device and requires the intervention of a human operator. The availability and productivity of such systems therefore remains to be improved.

Another hurdle, not considered in the prior art, to deploy fully autonomous manufacturing devices is that some manufacturing operations necessitate a continuous supply of manufacturing items such as screws, bolts, rivets, etc.

Finally, some manufacturing operations even require various sources of energy simultaneously such as electrical energy and compressed air for example.

SUMMARY

A need exists for an autonomous system and method for autonomous manufacturing of particularly complex tasks.

The invention may be embodied as a system and a method that allows autonomous manufacturing of complex manufacturing tasks such as to manufacture items and which provides a high-level of availability, and a high level of productivity. The invention may be further embodied to require minimal human intervention.

The invention may be embodied as a mobile autonomous manufacturing system comprising:

- an autonomously mobile main device requiring onboard energy storage, and adapted to perform a predetermined manufacturing task requiring supply of at least one type of manufacturing item,
- a first auxiliary device, adapted to store energy, in an autonomous mode, move autonomously and independently from the main device, connect with the main device to supply the main device with energy, in a synchronous mode, move synchronously with the main device, and
- a second auxiliary device, adapted to: store manufacturing items, in an autonomous mode, move autonomously and independently from the main device, supply the main device with manufacturing items, in a synchronous mode, move synchronously with the main device.

In a system embodying the invention, the main device, when connected with the first auxiliary device in a synchronous mode and having been supplied by the second auxiliary device, is adapted to perform complex manufacturing tasks requiring full autonomy and manufacturing items.

The term ‘auxiliary devices’ designates a group of auxiliary devices according to the invention, the auxiliary devices being of the same type or of various types.

The main device moves autonomously. The main device beneficially comprises a navigation system and one or multiple sensors to locate itself with respect to its environment.

Similarly, the auxiliary devices also each comprise a navigation system and one or multiple sensors to locate themselves with respect to their environment, and in particular with respect to the main device and to their loading station.

Moreover, in some embodiments, the main device may be fully autonomous and autonomously perform manufacturing tasks requiring the use of one or more type of manufacturing items.

The environment in which the main device operates and/or the complexity of the operations that the main device has to perform impedes connecting the main device to an energy source via an umbilical cord. In the invention, the main device requires onboard energy storage, that is an energy source that is mobile with the main device, in opposition to an umbilical cord. The range of tasks that such autonomous main device may perform is very extended as it does not need an umbilical connection to supply the main device with energy or manufacturing items.

A main device according to the invention, coupled to the first auxiliary device in a synchronous mode, is beneficially energetically autonomous. In the invention, the energy is provided to the main device by the first auxiliary device or by other auxiliary devices adapted to store energy, to connect to the main device to supply the main device with energy, and to move synchronously with the main device when connected to the main device.

In a synchronous mode, the first auxiliary device moves synchronously with the main device, while remaining connected to the main device to supply the main device with energy. In a synchronous mode, the first auxiliary device therefore acts as an on-board energy storage for the main device.

The main device comprises at least one energy socket to receive energy from an energy storing auxiliary device such as the first auxiliary device, through said energy socket. The first auxiliary device comprises a plug matching said socket of the main device to connect and supply energy to the main device. The first auxiliary device is adapted to dock to the main device—in other words the first auxiliary device is adapted to connect its plug to the socket of the main device to supply the main device with energy. More particularly, the first auxiliary device is adapted to automatically dock to the main device and connect its plug with the main device's socket.

The manufacturing items may comprise a wide range of items such as for example: joining parts, for example screws, bolts and rivets; or tools, for examples screwdriver bits, abrasive disks, and paint nozzles, etc., or commodities such as water and gases.

A system embodying the invention may further comprise a third auxiliary device, adapted to: store energy, in an autonomous mode, move autonomously and independently from the main device, connect with the main device to supply the main device with energy, and in a synchronous mode, move synchronously with the main device.

The third auxiliary device may store the same type of energy as the first auxiliary device. In some embodiments, the first auxiliary device and the third auxiliary device may store, for example: electrical energy, for example with electro-chemical batteries, or energy that can easily be transformed into electricity such as di-hydrogen for the local production of electricity onboard the main device, for example with a fuel cell, or compressed air.

The third auxiliary device may be adapted to replace the first auxiliary device when the first auxiliary device is discharged. Thereby, the main device need not to wait for the first auxiliary device to charge again before pursuing its manufacturing tasks. In particular, in a step of the method according to the invention, the third auxiliary device is charging at a loading station while the first auxiliary device is connected to the main device in a synchronous mode, supplying energy to the main device. At another step of the method, the first auxiliary device is charging at a loading station while the third auxiliary device is connected to the main device in a synchronous mode, supplying energy to the main device.

The main device may be adapted to be supplied with energy simultaneously by the first auxiliary device and the third auxiliary device.

In particular, the main device may comprise a plurality of sockets for receiving simultaneously at least at a plug from the first auxiliary device and a plug from the third auxiliary device.

Furthermore, the main device may be adapted to host at least one of the first auxiliary device and the second auxiliary device in a receptacle.

The main device may comprise a receptacle for each auxiliary device.

The main device may comprise a receptacle, in the form of a niche or an alcove for example, for hosting at least a portion of the auxiliary devices and where the auxiliary devices may supply energy or manufacturing items respectively to the main device. In the synchronous mode, the auxiliary devices may be onboard the main device and displace synchronously with the main device with their mobility systems deactivated and the mobility systems of the main device displacing the main device with the onboard auxiliary devices. The combination of the main device and the auxiliary devices in a synchronous mode thereby form a single autonomous unit. As long as the first auxiliary device is onboard the main device, the first auxiliary device acts as an on-board energy storage for the main device.

Each receptacle may comprise a socket or connection interface, for connecting the corresponding auxiliary device to the main device.

In some embodiments, the auxiliary devices supplying the main device with manufacturing items, such as the second auxiliary device, may dock with the main device and continuously supply the main device with manufacturing items. In such embodiments, the main device does not need an onboard storage receptacle for manufacturing items, but the availability of the auxiliary devices for supplying other main devices is reduced.

In other embodiments the auxiliary devices may discharge a load of manufacturing items in a dedicated storage receptacle on-board the main device such that the auxiliary devices for transporting manufacturing items remains less time in a synchronous mode with the main device and is therefore more available to supply other main devices. In such cases, the main device may interrupt its activities during the loading of manufacturing items. In other embodiments, the loading of manufacturing items onboard the main device is made while the main device continues to operate, with the second auxiliary device moving in a synchronous mode in the vicinity of the main device.

Moreover, an additional auxiliary device may be adapted to retrieve waste products from the main device. In particular the system may comprise an auxiliary device adapted to store waste products, in an autonomous mode, move autonomously and independently from the main device, approach the main device to retrieve waste products from the main device, and/or in a synchronous mode, move synchronously with the main device.

The second auxiliary device or other auxiliary devices for transporting manufacturing items may also ensure the function of waste recuperation. After having supplied the main device with manufacturing items, the same auxiliary device may be adapted to retrieve waste products from the main device.

The main device may be adapted to host the third auxiliary device in a receptacle. The main device may comprise multiple receptacles dedicated to energy storing auxiliary devices. In particular the main device may comprise multiple receptacles to host and connect with the first auxiliary device and the third auxiliary device simultaneously in a synchronous mode. In particular the main device may comprise two identical receptacles for simultaneously hosting two auxiliary devices with a same type of energy storage function.

In a method of the invention, when the energy level of the first auxiliary device is low, the third auxiliary device may join the main device and plug to the main device simultaneously with the first auxiliary device before the first auxiliary device disconnects from the main device. The main device may thus be supplied with energy continuously without interruption. Thereby, any program running on the main device does not need to restart and data integrity of the main device, as well as its efficiency is very high.

In some embodiments, the main device may be exempt of a dedicated onboard energy storage. In such embodiments, the main device has no power as soon as none of the auxiliary devices is connected to the main device.

The first auxiliary device and the third auxiliary device may beneficially be identical such that they can indistinctly occupy one or another receptacle onboard the main device, and they may also charge at the same loading station.

A system of the invention may also comprise multiple main devices, either of the same type or of various types, to perform multiple manufacturing tasks in parallel. More particularly a system of the invention may be deployed in a manufacturing plant in which the same task is operated in parallel at different manufacturing stations by multiple autonomously mobile main devices.

Beneficially in such embodiments, each main device may comprise a similar receptacle and socket to host indifferently the first auxiliary device, the third auxiliary device, or any other energy supplying autonomous device. Similarly, each main device may comprise a similar receptacle and socket to host indifferently the second auxiliary device, or any other manufacturing items supplying autonomous device.

The system may therefore comprise a high number of auxiliary devices. The auxiliary devices may be shared among the plurality of autonomously mobile main devices such that the number of auxiliary devices and loading stations per main device may be globally limited.

A system according to the invention may further comprise a fourth auxiliary device, adapted to: store a second type of energy, different from the energy type stored by the first auxiliary device, in an autonomous mode, move autonomously and independently from the main device, connect with the main device to supply the main device with the second type of energy, and/or in a synchronous mode, move synchronously with the main device.

In some embodiments, the first type of energy supplied by the first auxiliary device may be electricity, and the second type of energy stored and transported by the fourth auxiliary device may for example be compressed air.

Indeed in some embodiments a main device may require two distinct sources of energy: for example electricity for its displacement, running its onboard electronics and/or some manufacturing operations, as well as compressed air for some specific manufacturing operations.

In a system of the invention, the size and weight of a main device are limited, such that it may achieve a wide variety of manufacturing tasks, including in areas that are difficult to access. Indeed, supplying regularly the main device with compressed air for example, allows the main device to be devoid of a compressor-thereby limiting its size as well as its power consumption. The power consumption of compressing the air happens at the loading station, and not onboard the main device. Similarly the main device does not need large onboard batteries to store its energy as it can be regularly supplied with auxiliary devices. The same is also true in relation to manufacturing items.

A system according to the invention may further comprise a fifth auxiliary device, adapted to:

- store a second type of manufacturing items, different from the manufacturing items stored by the second auxiliary device,
- in an autonomous mode, move autonomously and independently from the main device,
- connect with the main device to supply the main device with the second type of energy, and
- in a synchronous mode, move synchronously with the main device.

In a system according to the invention, the main device may have a limited size, as it needs not to store large amounts of manufacturing items. Therefore the main device may operate manufacturing operations which are complex and require agility and multiple types of manufacturing items. A main device according to the invention may also access areas which would otherwise not be easily accessible.

The system may comprise a telecommunication device adapted to send a request signal upon a detection, by the main device or any of the auxiliary devices connected to the main device, of a low energy level in the first auxiliary device or of a low manufacturing item level in the second auxiliary device.

Similarly, the system is adapted to send a request signal upon detection, by the main device or any of the auxiliary devices connected to the main device, of a low level of energy or of manufacturing items in any the auxiliary devices.

In particular, the telecommunication device is adapted to send a request signal comprising data representative of a request for a supply in either a type of energy or in a type of manufacturing item corresponding to the low level detected. The request signal therefore also comprises data representative of the type of supply.

In some embodiments, the main device may comprise the telecommunication device.

The telecommunication device is adapted to send wireless signals. The telecommunication device may comprise a processing unit with a memory comprising a program for preparing said request signal based on inputs from sensors for detecting the level of energy and/or manufacturing items. The processing unit may be used for other activities. For example, a processing unit onboard the main device may also be controlling mobility and/or manufacturing tasks of the main device. The telecommunication device may also comprise a wireless interface card for transmitting wirelessly the request signal.

The system may be adapted, upon reception of a request signal, to generate instructions for an auxiliary device to be dispatched towards the main device.

In particular, the system comprises one or more receptors adapted to receive said request signals from the main device and, upon reception of said request signal, generate instructions for an auxiliary device to leave its loading station, travel towards the main device and dock with the main device in order to supply the main device. Said receptor(s) may be centralized and the instructions be sent to the appropriate auxiliary device, or they may be locally situated at a loading station, or they may be directly situated in the auxiliary devices.

Alternatively, the request signal may comprise instructions dedicated to a specific auxiliary device. In such cases the processing unit generating the request signal receives information from In a method according to the invention, one type or another of auxiliary device is dispatched towards the main device, depending on the data representative of the type of supply with a low level at the main device.

A system according to the invention may further comprise: at least one energy loading station comprising a loading device adapted to load the first auxiliary device with energy, and/or at least one manufacturing item loading station adapted to load the second auxiliary device with manufacturing items.

Similarly a system according to the invention may comprise multiple energy loading devices adapted to load other auxiliary devices with the same type or other types of energy, as well as multiple manufacturing item loading stations adapted to load other auxiliary devices with the same type or other types of manufacturing item.

In some embodiments, an auxiliary device for storing and transporting energy may dock automatically to an energy-loading device.

The manufacturing items may be loaded automatically or manually in an auxiliary device for transporting manufacturing items. Although an automated loading station for refilling the auxiliary device with manufacturing items allows automating the loading process, having a loading station simply consisting of a predetermined loading area for manually loading the auxiliary device also has benefits in the present invention. Indeed, the predetermined manufacturing item loading area may be distant from the area in which the main device operates, such that a human operator manually loading the auxiliary device may be at a safe distance from the main device, in particular when operations led by the main device are of potential danger for a human.

Also a system according to the invention may comprise at least one auxiliary device adapted to: acquire a manufacturing tool from the main device, deliver a manufacturing tool to the main device, in an autonomous mode: move autonomously and independently from the main device, and approach the main device.

In particular such tool transfer auxiliary devices may be adapted to approach the main device and remain in the vicinity of the main device until at least one manufacturing tool is transferred between the main device and the auxiliary device.

Such tool transfer auxiliary devices may be used to transfer manufacturing tools from one main device to another main device. Thereby heavy and/or expensive manufacturing tools may be transferred dynamically from one main device (or manufacturing platform) to another. Two or more main devices according to the invention may thus share a same set of manufacturing tools. The investment in such a manufacturing system is thereby limited, while the size and equipped weight of the main device is also limited.

The invention also extends to a method for operating a mobile autonomous manufacturing system, comprising:

- operating an autonomously mobile main device performing a predetermined manufacturing task with at least one type of manufacturing item,
- supplying energy to the main device by at least a first auxiliary device, by: storing energy onboard the first auxiliary device, in an autonomous mode, moving the first auxiliary device autonomously and independently from the main device, connecting the first auxiliary device with the main device to supply the main device with energy, in a synchronous mode, moving the first auxiliary device synchronously with the main device, while the first auxiliary device supplies the main device with energy,
- supplying manufacturing items to the main device by at least a second auxiliary device, by: storing manufacturing items onboard the second auxiliary device, in an autonomous mode, moving the second auxiliary device autonomously and independently from the main device, connecting the second auxiliary device with the main device to supply the main device with manufacturing items, in a synchronous mode, moving the second auxiliary device synchronously with the main device, while the second auxiliary device supplies the main device with manufacturing items.

Similarly to the system, a method of the invention allows to operate a very automated manufacturing plant, with a high level of efficiency of the robotics devices deployed.

A method according to the invention may also comprise: monitoring the level of energy of the first auxiliary device, upon detecting a level of energy of the first auxiliary device below a predetermined threshold, dispatching a request signal, upon reception of the request signal, dispatching a third auxiliary device with a level, above a predetermined threshold, of energy stored onboard, by: in an autonomous mode, moving the third auxiliary device autonomously and independently towards the main device, connecting the third auxiliary device with the main device to supply the main device with energy, in a synchronous mode, moving the third auxiliary device synchronously with the main device, while the third auxiliary device supplies the main device with energy.

As has been described, the operation of multiple auxiliary devices with the same use allows a continuous supply of the main device with energy and manufacturing items, thereby allowing a maximal availability of the main device for manufacturing tasks.

More particularly, some methods of the invention comprise: connecting the third auxiliary device with the main device to supply the main device with energy, while the first auxiliary device remains connected and supplying energy to the main device.

To do so, as described before, the third auxiliary device docks with the main device at a different receptacle than the receptacle at which the first auxiliary device is docked.

Methods of the invention may also comprise: disconnecting the first auxiliary device from the main device once the third auxiliary device is: connected to the main device, and supplying the main device with energy, in an autonomous mode, moving the first auxiliary device autonomously and independently towards a loading station, loading the first auxiliary device with energy at the loading station.

Once the main device is supplied with energy by the third auxiliary device, the first auxiliary device autonomously disconnects from the main device and rejoins a loading station in order to be reloaded with energy. Thereby, as soon as the first auxiliary device is reloaded with energy, it may replace again the third auxiliary device on the same main device, or replace another energy-carrying auxiliary device at another main device.

Methods of the invention may also comprise: monitoring the level of manufacturing items of the second auxiliary device, upon detecting a level of manufacturing items of the second auxiliary device below a predetermined threshold, dispatching a request signal, upon reception of the request signal, dispatching a sixth auxiliary device (16) with a level, above a predetermined threshold, of the same type of manufacturing items stored onboard, by: in an autonomous mode, moving the sixth auxiliary device autonomously and independently towards the main device, upon emission of a replacing signal by the main device: disconnecting the second auxiliary device, and connecting the sixth auxiliary device with the main device to supply the main device with manufacturing items, in a synchronous mode, moving the sixth auxiliary device synchronously with the main device, while the sixth auxiliary device supplies the main device with manufacturing items.

Contrary to the receptacles for energy, the main device may comprise only one receptacle for auxiliary devices comprising each type of manufacturing item. This allows optimizing the size of the main device. The replacement of a manufacturing items carrying auxiliary device with another one in the adequate receptacle implies only a short stop of the main device in its tasks. Besides, contrary to energy supplying auxiliary devices, the interruption of supply of manufacturing items does not imply a restart of the main device but only a short interruption, in some cases, of its manufacturing tasks.

In such embodiments of a method according to the invention, the method may comprise: dispatching the replacing signal once the sixth auxiliary device is in the vicinity of the main device.

Moreover, an additional condition may be added to the emission of the replacing signal. Indeed the request signal may be emitted when the level of manufacturing items is below a first threshold. However, in order to optimize the use of the stock of manufacturing items onboard the second auxiliary device, a second threshold, below the first threshold may be memorized below which the replacing signal is emitted. Such a second threshold may correspond for example to an empty status of the storage of manufacturing items in the second auxiliary device. The sixth auxiliary device would thus wait in the vicinity of the main device while the main device continues to perform its manufacturing tasks until the second auxiliary device is completely empty and the replacing signal is emitted.

Similarly to the request signal, the replacing signal may for example be transmitted directly from the main device to the auxiliary devices or it may go through a central unit or through local units which may be situated at the loading stations.

A method of the invention may extend to a manufacturing method comprising some or all the steps of the method for operating a mobile autonomous manufacturing system.

SUMMARY OF DRAWINGS

The invention also extends to other possible combinations of features described in the above description and in the following description relative to the figures. In particular, the invention extends to manufacturing systems and devices comprising features described in relation to the method for operating such system. The invention also extends to methods of the invention comprising features described in relation to the system.

Some specific exemplary embodiments and aspects of the invention are described in the following description in reference to the accompanying figures.

DETAILED DESCRIPTION

Figure 1:
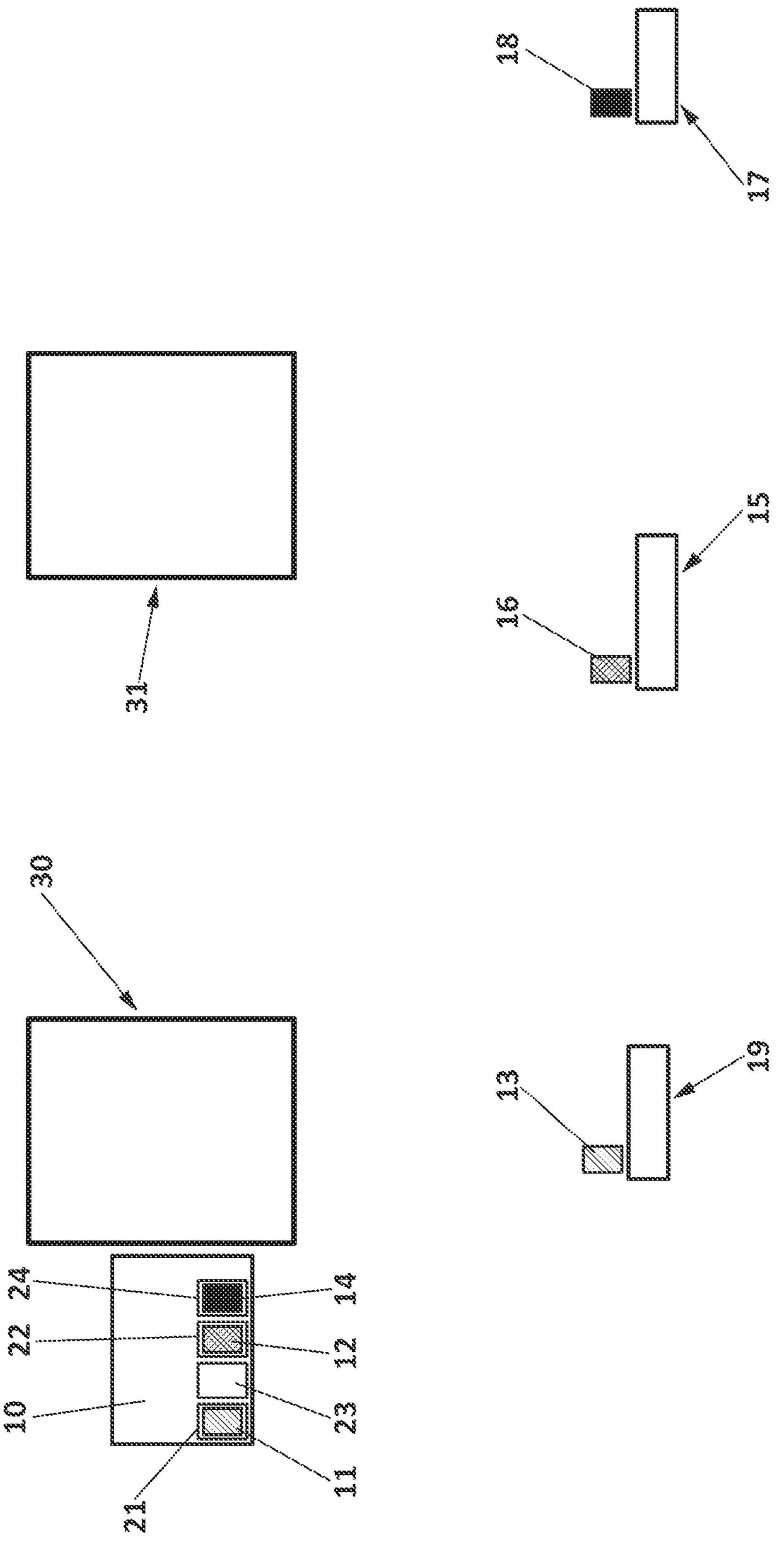
FIGS. 1 to 6 are schematic representations of a specific embodiment of a system according to the invention.

FIGS. 1 to 6 schematically represent a manufacturing plant comprising an autonomously mobile main device 10, and multiple auxiliary devices (11, 12, 13, 14, 16, 18). The manufacturing plant also comprises two manufacturing areas (30, 31). Moreover, the manufacturing plant comprises multiple loading stations (19, 15, 17).

The main device 10 is adapted to move autonomously at least between the first manufacturing station 30 and the second manufacturing station 31. The auxiliary devices (11, 12, 13, 14, 16, 18) are adapted to move autonomously at least between the main device 10 and their respective loading stations (19, 15, 17).

In this embodiment, the auxiliary devices embark on board the main device when in the synchronous mode.

In FIG. 1, the main device is represented at a first location with respect to the first manufacturing station 30.

A first auxiliary device 11 is adapted to store electrical energy. In FIG. 1, the first auxiliary device 11 is in a synchronous mode with the main device 10, supplying electrical energy to the main device 10. The first auxiliary device 11 is in a first receptacle 21 of the main device.

A second auxiliary device 12 is adapted to store manufacturing items. In FIG. 1, the second auxiliary device 12 is also in a synchronous mode with the main device 10, supplying the main device with manufacturing items. The second auxiliary device 12 is in a second receptacle 22 of the main device.

A third auxiliary device 13 is at an energy loading station 19, being loaded with electrical energy, the third auxiliary device 13 being identical to the first auxiliary device 11 and as such being adapted to store electrical energy. The main device 10 comprises an empty receptacle 23 adapted to host the third auxiliary device 13.

A fourth auxiliary device 14 is adapted to store energy in the form of compressed air. In FIG. 1, the fourth auxiliary device 14 is also in a synchronous mode with the main device 10, supplying the main device with compressed air. The fourth auxiliary device 14 is in a fourth receptacle 24 of the main device.

The system also comprises a fifth auxiliary device 18, identical to the fourth auxiliary device 14. In FIG. 1, the fifth auxiliary device 18 is at a loading station 17, being reloaded with compressed air.

Furthermore, the system comprises a sixth auxiliary device 16, identical to the second auxiliary device 12. In FIG. 1, the sixth auxiliary device 16 is at a loading station 15, being reloaded with manufacturing items. As mentioned before, the reloading of the auxiliary devices may be achieved manually or automatically.

Figure 2:
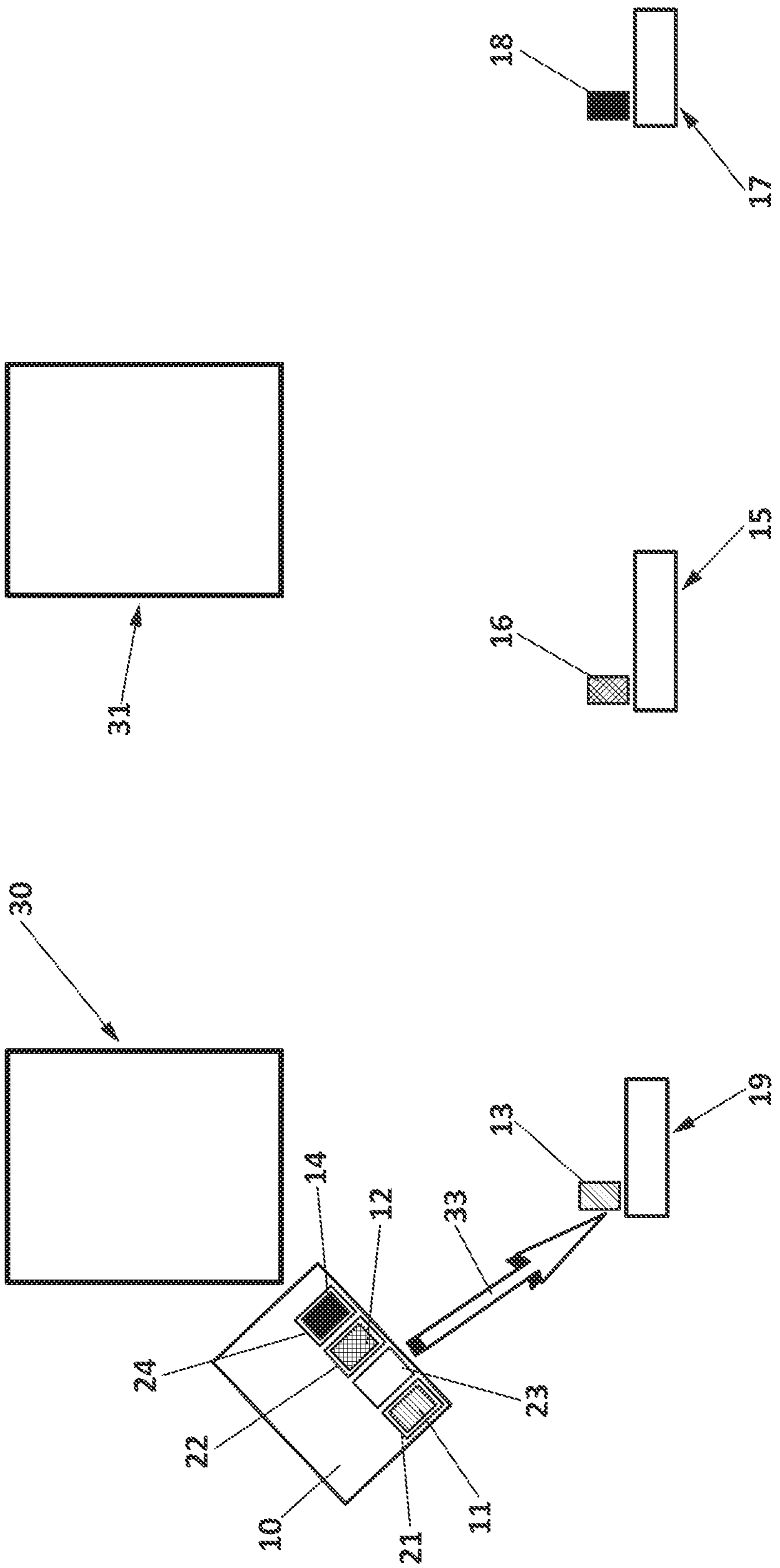

FIG. 2 represents the same devices in a situation where the main device has carried on various manufacturing tasks and the energy level of the first auxiliary device 11 is low. Upon detection of this low level-below a predefined threshold—of energy of the first auxiliary device 11, the main device sends a request signal 33 towards the loading station 19 for electrical energy transporting auxiliary devices.

Upon receiving the request signal, the loading station 19 elaborates and transmits instructions to the auxiliary device 13 being recharged. Although in this embodiment only one auxiliary device is represented at the loading stations, each loading station may be adapted to accommodate a plurality of auxiliary devices of the same type. The instructions have for consequence for the auxiliary device 13 to be dispatched towards the main device, as long as the energy level of the auxiliary device 13 is above a predetermined threshold.

Figure 3:
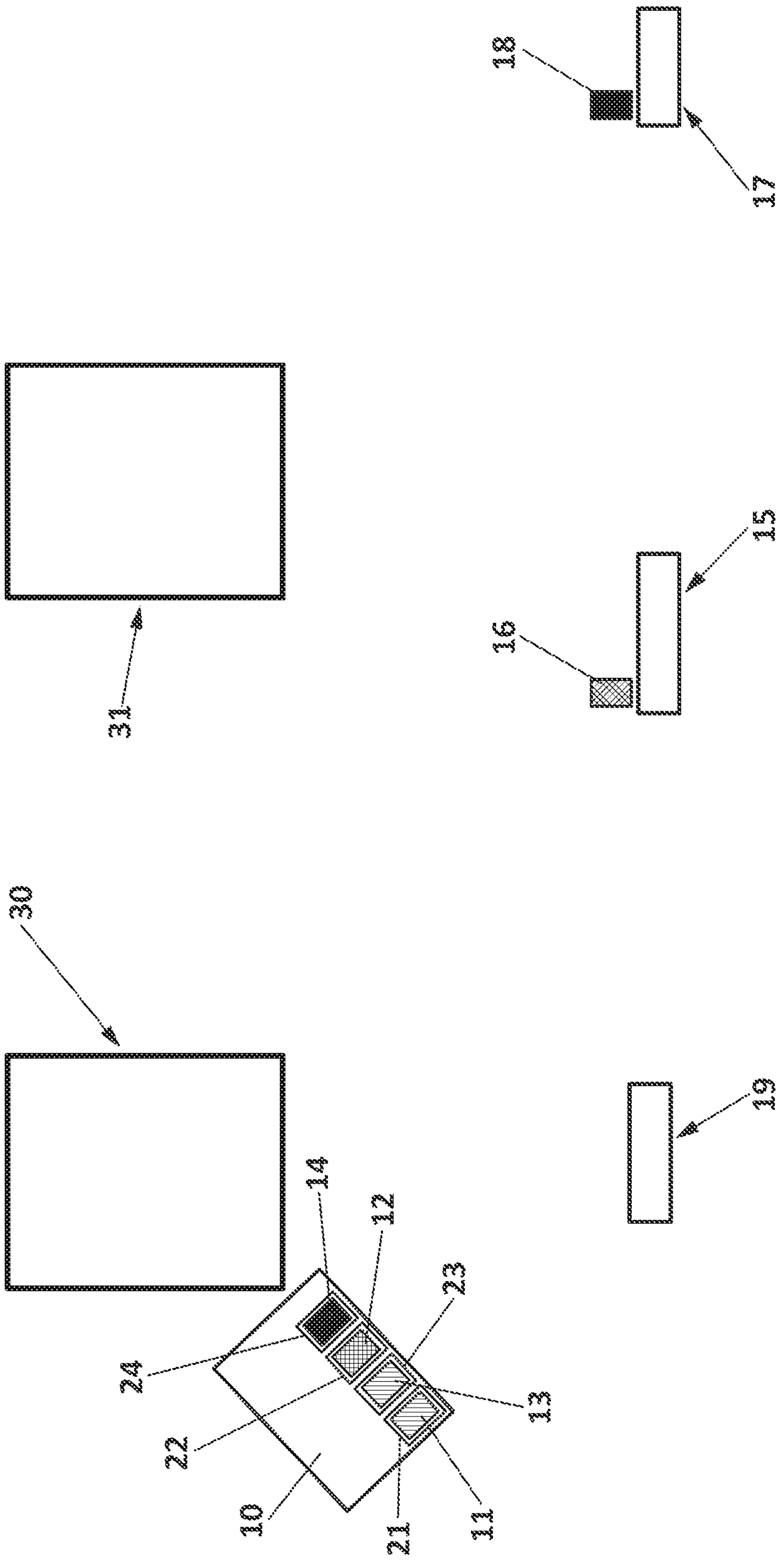

FIG. 3 represents a situation in which the third auxiliary device 13 moved autonomously towards the main device 10, docked to it in the corresponding receptacle 23 and is connected to the main device 10 to supply the main device with electricity. The main device 10 is then electrically connected to both the first auxiliary device 11 and the third auxiliary device 13.

Figure 4:
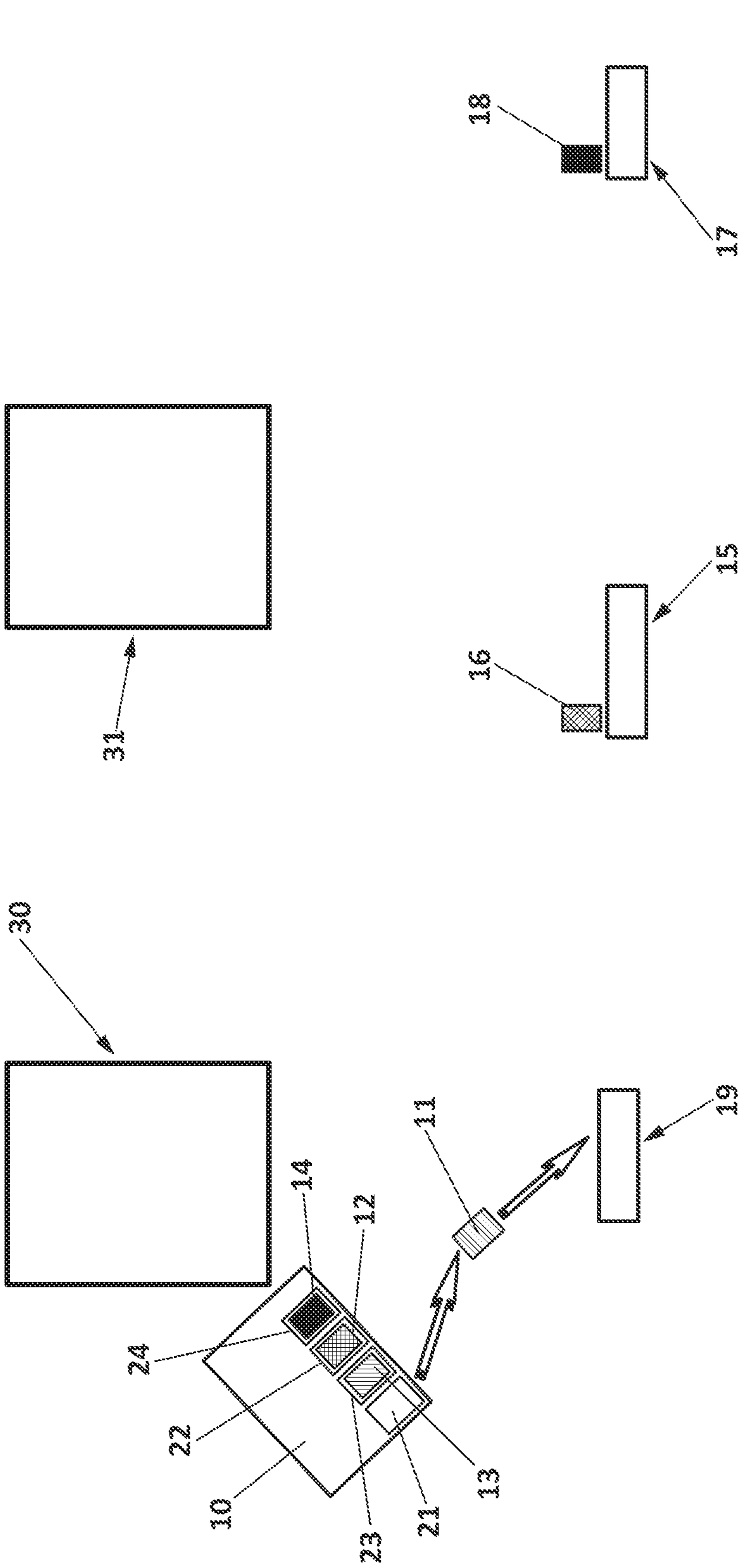

In FIG. 4, the first auxiliary device 11 has disconnected—undocked—from the main device 10 such that the receptacle 21 remains available. The first auxiliary device 11 is moving autonomously towards its loading station 19. The main device 10 continues to carry its manufacturing tasks.

The docking of the third auxiliary device 13 and the undocking of the first auxiliary device 11 do not impede the main device 10 to carry on with its manufacturing tasks.

Figure 5:
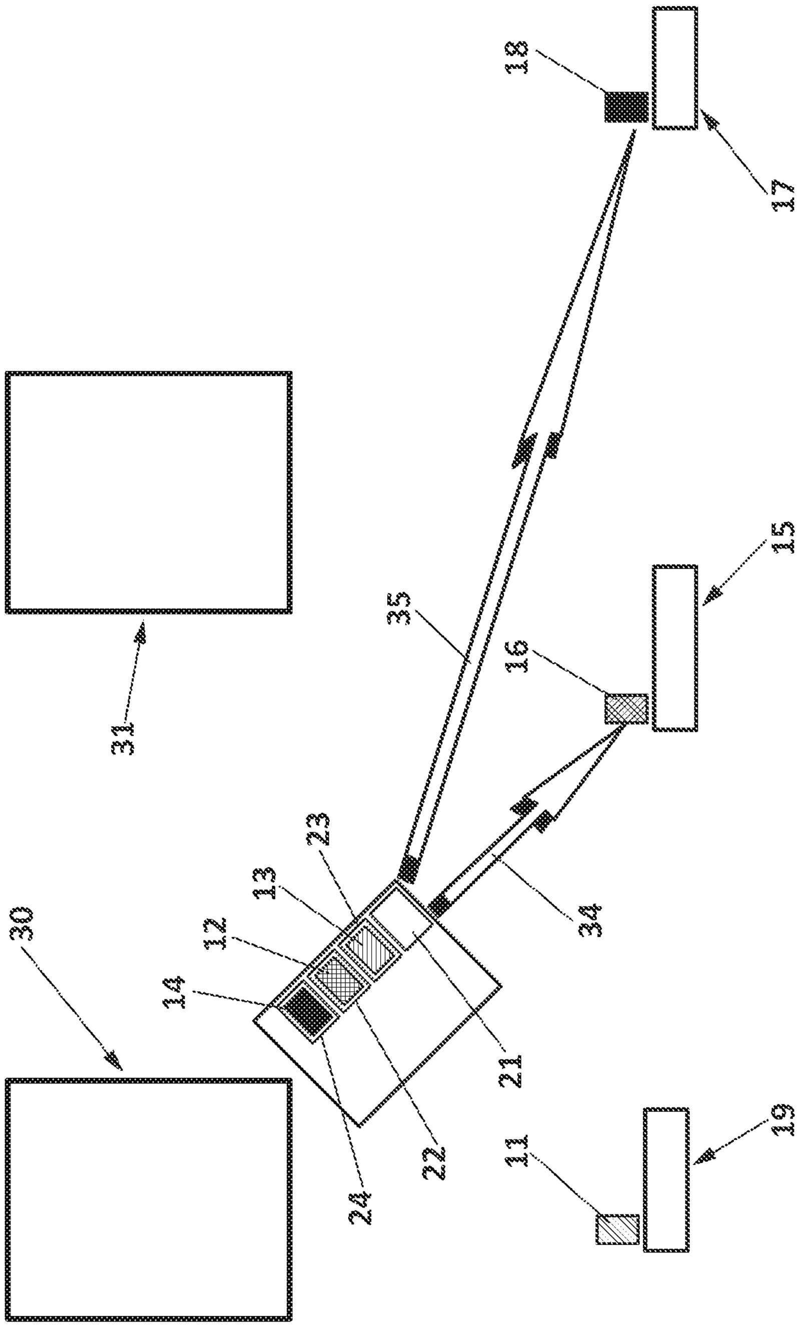

In FIG. 5, the main device 10 sends a request signal 34 towards the loading station 15 at which auxiliary devices for transporting manufacturing items may be loaded. The main device 10 also sends a request signal 35 towards the loading station 17 at which auxiliary devices with compressed air may be loaded.

In a method according to the invention, the thresholds at which request signals are sent are predetermined such that the main device 10 may carry on its manufacturing tasks until a fully loaded auxiliary device arrives in the vicinity of the main device 10.

Figure 6:
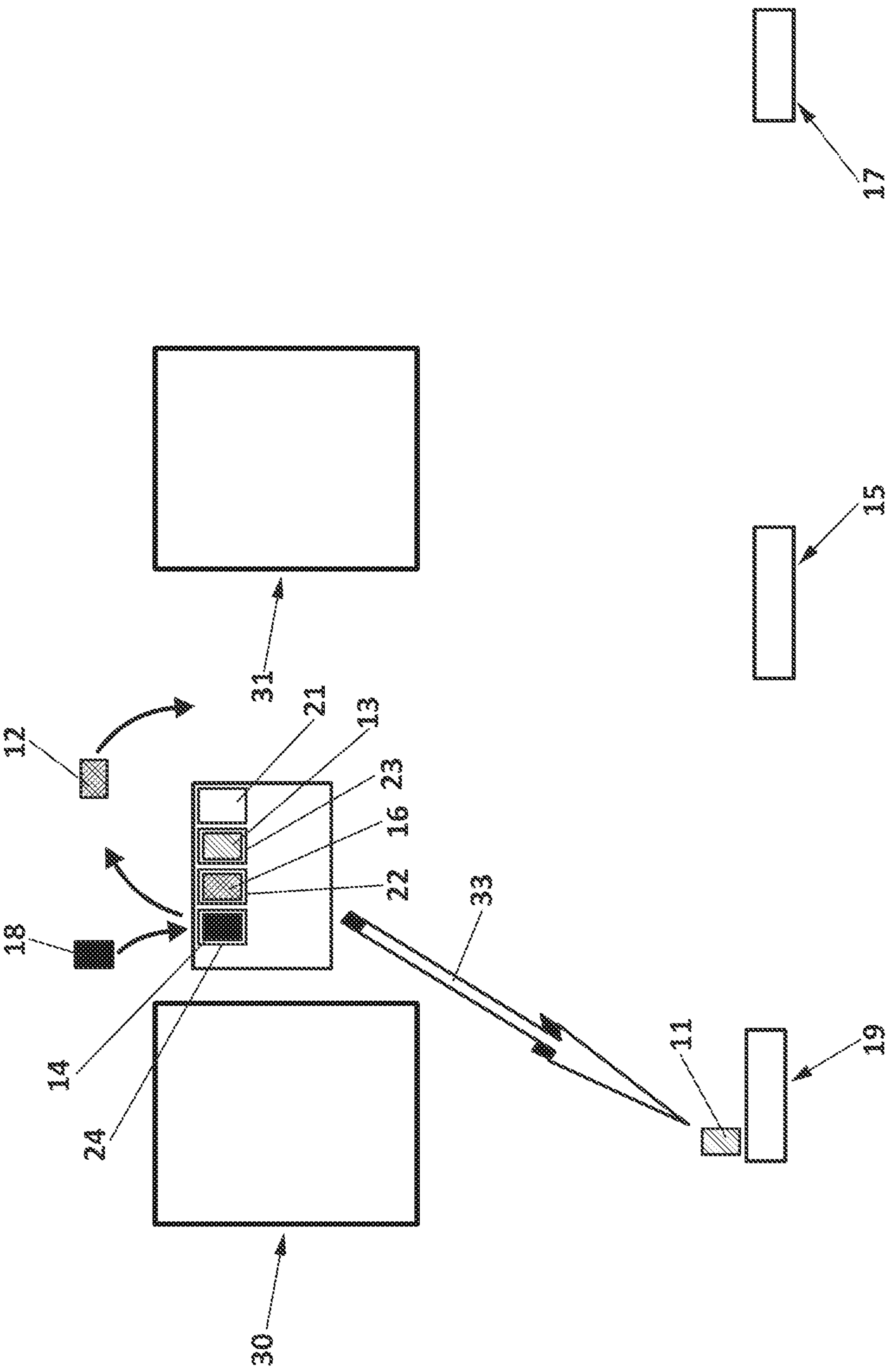

In FIG. 6, the auxiliary device 16 that was being loaded at station 15 has moved in an autonomous mode towards the main device and docked to the main device 10 while the auxiliary device 12 that was previously supplying the main device 10 with manufacturing items is undocked and moving autonomously towards the loading station 15.

The auxiliary device 18, which was being loaded at the compressed air loading station 17, is moving in autonomous mode in the vicinity of the main device 10. The auxiliary device 14 supplying compressed air to the main device is in synchronous mode with the main device and remains in synchronous mode with the main device as long as its compressed air level has not reached a lower threshold. Once this lower threshold is reached, the auxiliary device 14 in synchronous mode with the main device disconnects from the main device and lets the receptacle 24 available for the replacing auxiliary device 18. The auxiliary device 18 in the vicinity of the main device replaces the auxiliary device 14 as soon as the auxiliary device 14 supplying compressed air to the main device has undocked from the main device.

In FIG. 6, the main device 10 also sends a new request signal 33 for electricity supply towards the loading station 19 at which the first auxiliary device 11 is being loaded.

Figure 7:
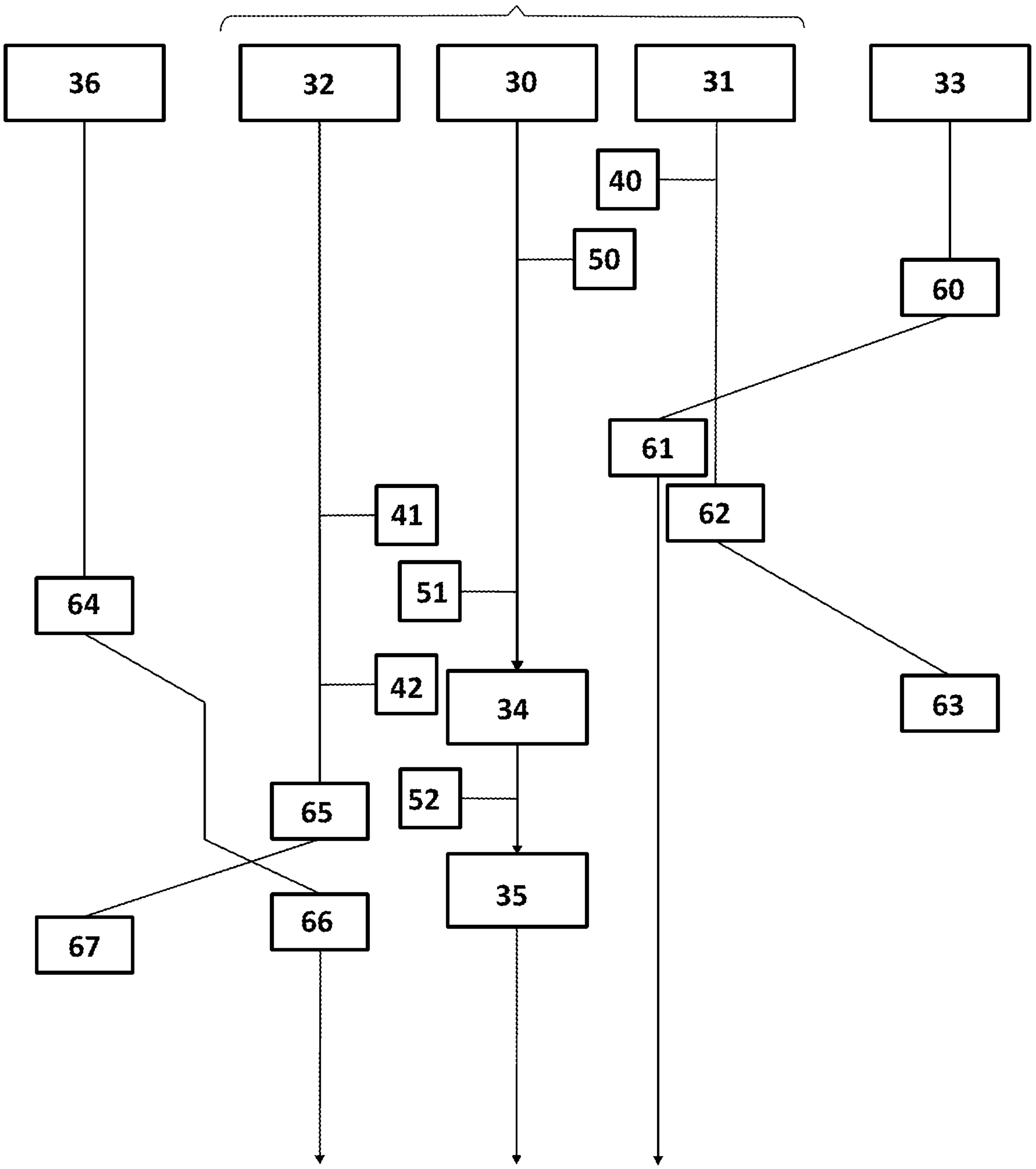
FIG. 7 is a schematic representation of steps of a method according to the invention.

FIG. 7, represents a method according to the invention with a timeline going from the top to the bottom of the figure. The line beginning at box 30 represents the process led by a main device of a system according to the invention. The line beginning at box 31 represents the process led by the first auxiliary device. The line beginning at box 33 represents the process led by the third auxiliary device. The line beginning at box 32 represents the process led by the second auxiliary device. The line beginning at box 36 represents the process led by a fifth auxiliary device, the fifth auxiliary device being identical to the second auxiliary device.

The bracket represents devices that are in synchronous mode with the main device.

In this process many steps are led in parallel. Represented on the top of FIG. 7, the following steps are led in parallel:

- Step 30 of autonomous manufacturing led by the main device,
- Step 31 of supplying the main device with electrical power by a first auxiliary device in synchronous mode with the main device,
- Step 32 of supplying the main device with manufacturing items by a second auxiliary device in synchronous mode with the main device,
- Step 33 of loading the electrical batteries of a third auxiliary device at a loading station, and
- Step 36 of loading the fifth auxiliary device with manufacturing items at a loading station.

Step 40 represents the detection by the first auxiliary device of a low battery level. As a consequence, the main device emits a request signal 50 for an energy supply.

Upon reception of the request signal 50 at an energy loading station, in step 60, the third auxiliary device is dispatched towards the main device. Thereafter the third auxiliary device travels in an autonomous mode towards the main device. Once the third auxiliary device reaches the main device, it docks at step 61 with the main device to supply the main device with electric power. At this stage the third auxiliary device and the first auxiliary device are simultaneously docked and electrically connected to the main device.

At step 62, the first auxiliary device undocks and disconnects from the main device. The first auxiliary device then moves in an autonomous mode towards the energy loading station. In step 63, the first auxiliary device reaches and docks to the energy loading station to load its electrical batteries.

At step 41, a low level of manufacturing items-below a first threshold—in the second auxiliary device is detected. As a consequence, the main device emits a request signal 51 for manufacturing items. Upon reception of the request signal 51 by the manufacturing items loading station, in step 64, the fifth auxiliary device is dispatched towards the main device. Once the fifth auxiliary device is in the vicinity of the main device, it remains in the vicinity of the main device without docking to the main device.

At step 42, a second threshold of manufacturing items-below the first threshold—in the second auxiliary device is reached. The second threshold may correspond to a situation in which no manufacturing item remains in the second auxiliary device. As a consequence, in step 34, the main device interrupts its manufacturing tasks and emits a replacing signal 52.

Upon receiving the replacing signal 52, the seventh auxiliary device undocks from the main device in step 65. The second auxiliary device leaves the synchronous mode and moves in autonomous mode towards the manufacturing items loading station. In step 67, the second auxiliary device reaches the manufacturing items loading station where it may be loaded automatically or manually.

After step 65, at step 66, the fifth auxiliary device docks to the main device to supply the main device with manufacturing items. The main device resumes, in step 35, its manufacturing tasks with the third auxiliary device and the fifth auxiliary device in the synchronous mode.

Figure 8A:
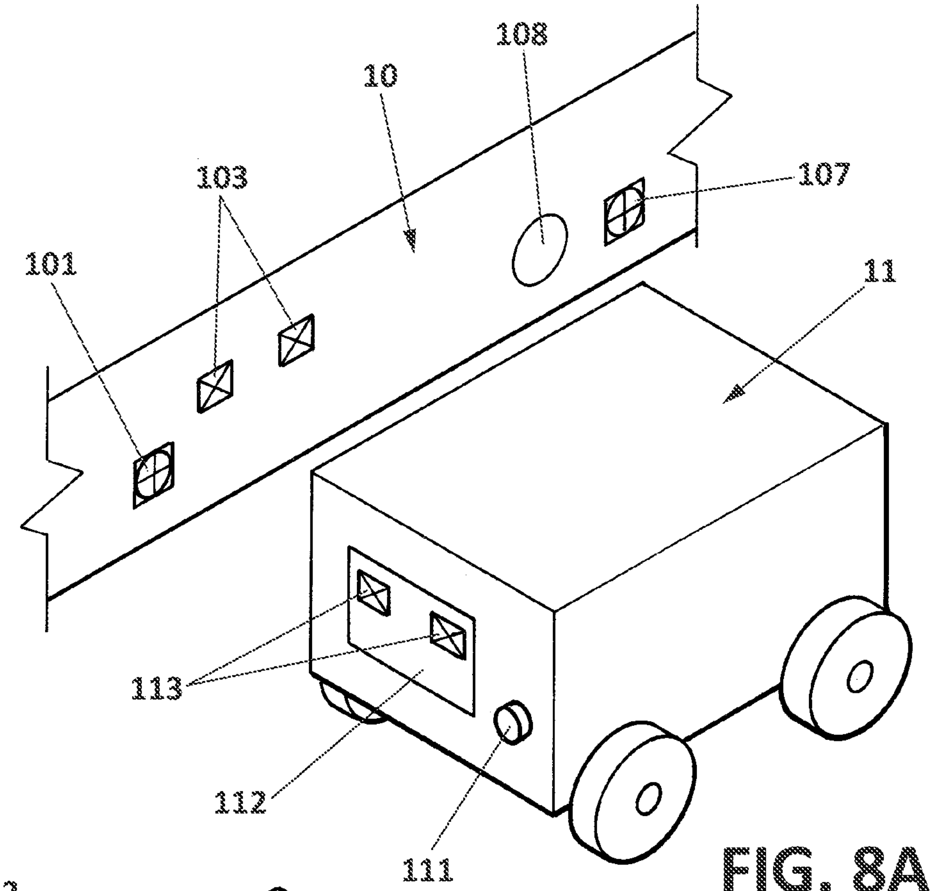
FIGS. 8A and 8B represent exemplary embodiments of auxiliary devices of a system according to the invention.

In FIG. 8A a first auxiliary device 11 according to the invention is represented, as well as a portion of a main device, in particular a portion of an interface panel 102 of the main device 10.

The auxiliary device 11 comprises mobility functions ensured at least in part by wheels and a processing unit adapted to control motors for actuating the wheel in order to be able to move autonomously between a loading station and the main device 10. The auxiliary device 11 comprises onboard electrochemical batteries to store electrical energy. Moreover, the auxiliary device 11 comprises an interface panel 112 which comprises a plug 113 adapted to connect to a corresponding socket 103 on an interface panel 102 of the main device 10. The auxiliary device 11 further comprises a camera 111 adapted to capture images and to deliver these images to the processing unit of the auxiliary device 11, such that a guiding method based for example on image recognition may be implemented for the auxiliary device 11 to move in autonomous mode. Moreover, the main device's interface panel 102 may comprise a target 101 in order to assist the guidance of the auxiliary device 11 in its approach with the main device. In particular the camera 111 of the auxiliary device 11 is adapted to capture images of the target 101 of the main device upon approaching the main device to dock to the main device.

Figure 8B:
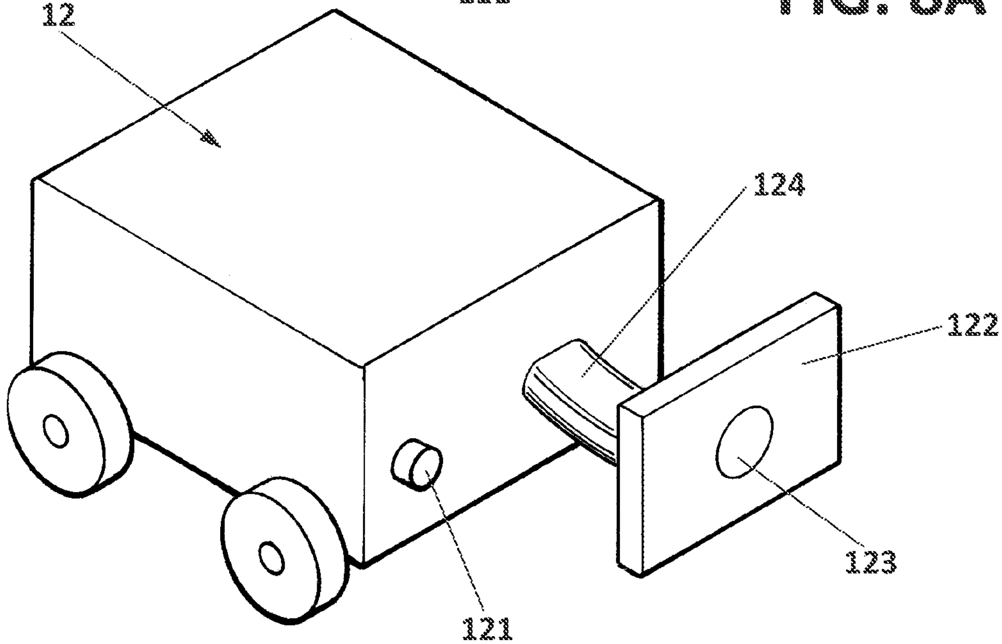

In FIG. 8B, similarly, a second auxiliary device 12 is represented. This second auxiliary device 12 also comprises mobility functions ensured at least in part by wheels and a processing unit adapted to control motors for actuating the wheel in order to be able to move autonomously between a loading station and the main device 10. The auxiliary device 12 is adapted to store manufacturing items, such as rivets for example.

Moreover, the auxiliary device 12 comprises an interface panel 122 which comprises a plug or opening 123 adapted to connect to a corresponding socket or opening 108 on an interface panel 102 of the main device 10. The auxiliary device 12 further comprises a camera 121 adapted to capture images and to deliver these images to the processing unit of the auxiliary device 12, such that a guiding method based for example on image recognition may be implemented for the auxiliary device 12 to move in autonomous mode. Moreover, the main device's interface panel 102 may comprise a target 107 in order to assist the guidance of the auxiliary device 12 in its approach with the main device. In particular the camera 121 of the auxiliary device 12 is adapted to capture images of the target 107 of the main device upon approaching the main device to dock to the main device.

The main difference between the second auxiliary device 12 and the first auxiliary device 11 is that the interface panel 102 of the second auxiliary device 12 is connected to the auxiliary device 12 by a tube connection 124, such that the auxiliary device 12 may remain mobile with respect to the main device when connected to the main device.

Also, the second auxiliary device 12 comprises an opening 123 which is adapted to connect to the opening 108 of the main device in order to refill the main device with manufacturing items.

Figure 9:
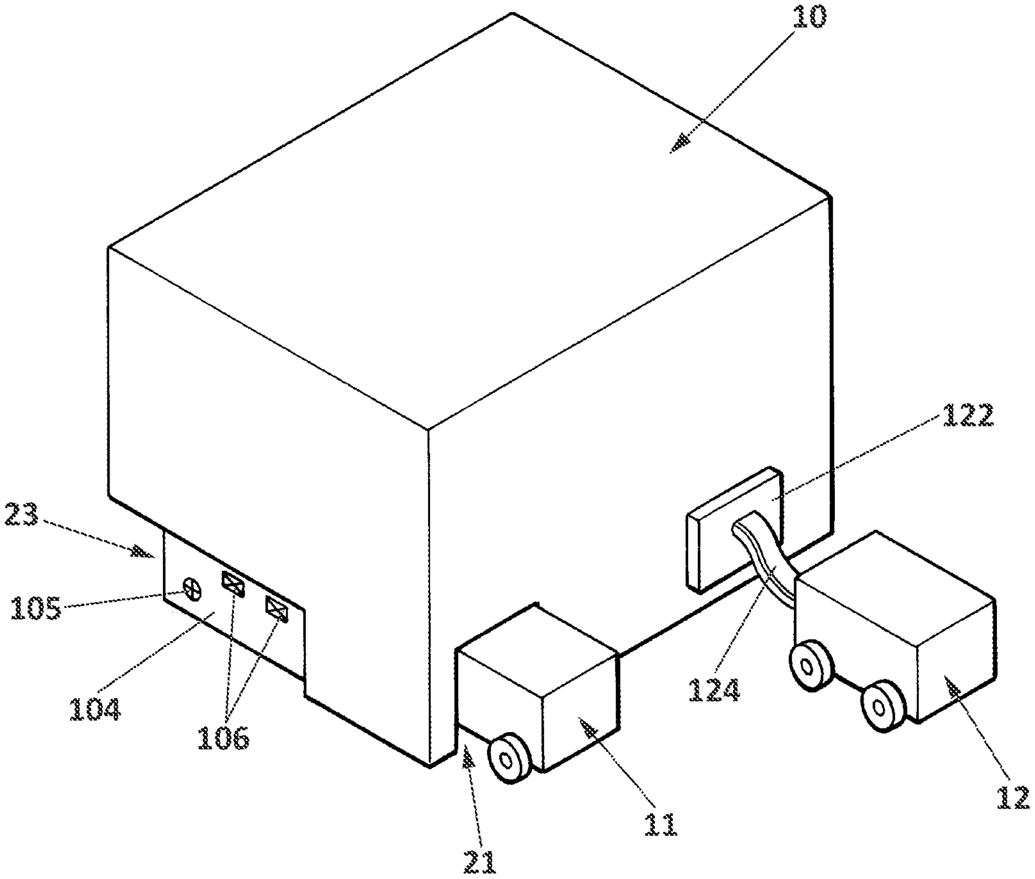
FIG. 9 represents a system according to the invention with a main device connected to two auxiliary devices.

In FIG. 9, a main device 10 with the first auxiliary device 11 and the second auxiliary device 12 connected to it in synchronous mode is represented.

The first auxiliary device 11 is docked to the main device in a receptacle 21 of the main device so as to move with the main device in synchronous mode. The first auxiliary device 11 may deactivate its mobility functions such that it is displaced by the main device.

The second auxiliary device 12 is connected to the main device by its interface and tube connection 124. The second auxiliary device 12 is also in synchronous mode with the main device 10 but the second auxiliary device 12 uses its own mobility functions to move in synchronous mode with the main device.

The main device comprises at least one further receptacle 23 comprising an interface 104 with a socket 106 and a target 105 for receiving an additional auxiliary device, for example a second power storing and transporting auxiliary device.

The invention is not limited to the specific embodiments herein disclosed as examples. The invention also encompasses other embodiments not herein explicitly described, which may comprise various combinations of the features herein described.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. It is to be noted that the term “or” as used herein is to be interpreted to mean “and/or”, unless expressly stated otherwise.

The invention claimed is:

1. A mobile autonomous manufacturing system comprising:

an autonomously mobile main device including a receptacle for receiving onboard energy storage, and the main device is adapted to perform a predetermined manufacturing task requiring supply of manufacturing items, a first auxiliary device adapted to:

store energy, operate in an autonomous mode to move autonomously and independently from the main device, connect with the main device to supply the main device with energy, and operate in a synchronous mode to move synchronously with the main device, a second auxiliary device adapted to:

store the manufacturing items, operate in an autonomous mode to move autonomously and independently from the main device, automatically supply the main device with the manufacturing items, and operate in a synchronous mode to move synchronously with the main device, and a third auxiliary device adapted to:

store a second type of energy, different from a first type energy stored by the first auxiliary device, operate in an autonomous mode to move autonomously and independently to the main device, connect with the main device to supply the main device with the second type of energy, and operate in a synchronous mode to move synchronously with the main device.

2. The system according to claim 1, further comprising a fourth auxiliary device adapted to:

store energy, operate in an autonomous mode to move autonomously and independently from the main device, automatically connect with the main device to supply the main device with energy, and operate in a synchronous mode to move synchronously with the main device.

3. The system according to claim 2, wherein the main device is adapted to be supplied with energy simultaneously by the first auxiliary device and by the fourth auxiliary device.

4. The system according to claim 1, wherein the main device is adapted to host at least one of the first auxiliary device and the second auxiliary device in a receptacle of the main device.

5. The system according to claim 1 further comprising:

at least one energy loading station comprising a loading device adapted to load the first auxiliary device with energy, and at least one manufacturing item loading station adapted to load the second auxiliary device with the manufacturing items.

6. The system according to claim 1, further comprising a fifth auxiliary device adapted to:

store a second type of manufacturing items, different from the manufacturing items stored by the second auxiliary device, operate in an autonomous mode to move autonomously and independently from the main device, connect with the main device to supply the main device with the second type of the manufacturing items, and operate in a synchronous mode to move synchronously with the main device.

7. The system according to claim 1, further comprising a telecommunication device adapted to send a request signal upon a detection, by the main device or any of the first and second auxiliary devices connected to the main device, of a low energy level in the first auxiliary device or of a low manufacturing item level in the second auxiliary device.

8. The system according to claim 7, wherein the system is adapted, upon reception of a request signal, to generate instructions for another auxiliary device to be dispatched to the main device.

9. A method for operating a mobile autonomous manufacturing system, the method comprising:

operating a main device to move autonomously to perform a predetermined manufacturing task using at least one type of manufacturing item, supplying a first type of energy to the main device by a first auxiliary device, wherein the first auxiliary device automatically:

stores the first type of energy onboard the first auxiliary device, operates in an autonomous mode in which the first auxiliary device moves autonomously and independently with respect to the main device, connects to the main device to supply the main device with the first type of energy, and operates in a synchronous mode in which the first auxiliary device moves synchronously with the main device while the first auxiliary device supplies the main device with the first type of energy, supplying manufacturing items to the main device by a second auxiliary device by:

storing the manufacturing items onboard the second auxiliary device, automatically operating the second auxiliary device in an autonomous mode in which the second auxiliary device moves autonomously and independently with respect to the main device, automatically connecting the second auxiliary device to the main device, and automatically operating in a synchronous mode during which the second auxiliary device moves synchronously with the main device while the second auxiliary device supplies the main device with the manufacturing items, and supplying a second type of energy to the main device by a third auxiliary device, wherein the third auxiliary device automatically:

stores the second type of energy, wherein the second type of energy is different from the first type energy stored by the first auxiliary device, operate in an autonomous mode to move autonomously and independently to the main device, connect with the main device to supply the main device with the second type of energy, and operate in a synchronous mode to move synchronously with the main device.

10. The method according to claim 9, further comprising:

monitoring a level of energy stored in the first auxiliary device, in response to detecting the level of energy below a predetermined threshold, automatically dispatching a request signal, in response to reception of the request signal, automatically dispatching a fourth auxiliary device with a level of at least one of the first type of energy or the second type of energy stored on the fourth auxiliary device which is above a predetermined threshold level of energy, in response to being dispatched, the fourth auxiliary device moves automatically in an autonomous mode autonomously and independently to the main device, automatically connecting the fourth auxiliary device to the main device, while connected to the main device, operating the fourth auxiliary device automatically in a synchronous mode during which the fourth auxiliary device moves synchronously with the main device while the fourth auxiliary device supplies the main device with at least one of the firth type or second type of energy.

11. The method according to claim 10, further comprising:

automatically disconnecting the first auxiliary device from the main device after the fourth auxiliary device performs the connection to the main device and the supplying of the main device with the first type or the second type of energy, after the disconnecting step, operating the first auxiliary device in the autonomous mode to move the first auxiliary device autonomously and independently to a loading station, and loading the first auxiliary device with the first type of energy at the loading station.

12. The method according to claim 10, wherein the steps of automatically connecting the fourth auxiliary device and operating the fourth auxiliary device in the synchronous mode are performed while the first auxiliary device is connected to and supplying energy to the main device.

13. The method according to claim 9, further comprising:

monitoring the manufacturing items being supplied by the second auxiliary device to the main device, in response to detecting a remaining amount manufacturing items stored in the second auxiliary device being below a threshold, automatically dispatching a request signal, in response to receiving the request signal, automatically dispatching a sixth auxiliary device with a supply of the manufacturing items, and automatically operating the sixth auxiliary device in an autonomous mode to move the sixth auxiliary device autonomously and independently to the main device, automatically connecting the sixth auxiliary device to the main device, and automatically moving the sixth auxiliary device in a synchronous mode to move synchronously with the main device while the sixth auxiliary device supplies the main device with the manufacturing items.

14. The system according to claim 13, further comprising:

automatically issuing a replacing signal by the main device as the sixth auxiliary device approaches the main device; and in response to the replacing signal, automatically disconnecting the second auxiliary device from the main device.

15. A method comprising:

dispatching a first auxiliary robotic device from an energy supply station, wherein the first auxiliary robotic device stores a first type of energy;

causing the first auxiliary robotic device to move automatically to a main robotic device;

automatically connecting the first auxiliary robotic device to the main robotic device;

supplying the main robotic device with the first type of energy from the first auxiliary robotic device, while the first auxiliary robotic device is connected to the main robotic device;

automatically dispatching a second auxiliary robotic device with manufacturing items from at least one manufacturing item supply station;

causing the second auxiliary robotic device to move automatically to the main robotic device, automatically connecting the second auxiliary robotic device to the main robotic device, automatically moving an assembly of the main robotic device, the first auxiliary robotic device and the second auxiliary robotic device to perform a manufacturing task to install the manufacturing items stored on the second auxiliary robotic device while the assembly is powered by energy from the first auxiliary robotic device;

storing in a third auxiliary robotic device a second type of energy, different from a first type energy, operating the third auxiliary robotic device in an autonomous mode to move autonomously and independently to the main robotic device, connecting the third auxiliary robotic device to the main robotic device, and moving the third auxiliary robotic device synchronously with the main robotic device while the third auxiliary robotic device supplies the main robotic device with the second type of energy.

16. The method of claim 15, further comprising:

automatically monitoring the manufacturing items stored in the assembly, in response to detecting that an amount of the manufacturing item being below a threshold, automatically dispatching a fifth auxiliary robotic device from the at least one manufacturing item supply station, wherein the fifth auxiliary robotic device has a supply of the manufacturing items, automatically moving the fifth auxiliary robotic device towards the main robotic device, automatically disconnecting the second auxiliary robotic device from the assembly as the fifth auxiliary robotic device approaches the main robotic device;

connecting the fifth auxiliary robotic device to the main robotic device to replace the second auxiliary robotic device in the assembly, and thereafter repeating the step of automatically moving the assembly and performing the manufacturing task.

17. The method of claim 15, further comprising:

monitoring a level of energy in the assembly;

in response to detecting the level of energy below a threshold, automatically dispatching a fourth auxiliary robotic device with a supply of the first type or the second type of energy;

automatically moving the the fourth auxiliary device towards the main robotic device, automatically disconnecting the first auxiliary robotic device or the third auxiliary robotic device from the assembly as the fourth auxiliary robotic device approaches the main robotic device;

automatically connecting the fourth auxiliary robotic device to the main robotic device and replacing in the assembly the first auxiliary robotic device or the third auxiliary robotic device with the fourth auxiliary robotic device, and thereafter repeating the step of automatically moving the assembly and performing the manufacturing task.

* * * * *